Patented July 30, 1935

2,009,526

UNITED STATES PATENT OFFICE 2,009,526

ANTIOXIDANT

Waldo L. Semon, Silver Lake Village, Ohio, assignor to The B. F. Goodrich Company, New York, N. Y., a corporation of New York No Drawing. Application June 2, 1933, Serial No. 674,040

12 Claims. (Cl. 18—50)

This invention relates to the art of preserving rubber, synthetic plastics, fatty oils, petroleum products, and like organic materials against unduly rapid deterioration due to oxidation and the like.

This invention, in brief, consists in treating the rubber or other like organic material with a member of a class of compounds which may be designated as aryl substituted naphthylene diamines. The two amino groups may occupy any position in the naphthalene nucleus, for example, the 1,2 positions, or 1,4, or 1,5, or 1,8. Certain positions are found to render the compound more active than others, the 1,4 position being particularly useful. Either one or both of the amino groups may contain aryl substituents such as phenyl, ortho, meta or para-tolyl, xylyl, pseudocumyl, ethyl-phenyl, cumyl, biphenyl, naphthyl, anthracyl, etc.

For example, the following compounds are typical members of the class of anti-oxidants described above: 1-amino 4-phenylamino naphthalene; 1-amino 2-phenylamino naphthalene; 1-amino 5-phenyl-amino naphthalene; 1-amino 8-phenylamino naphthalene; 1-amino 4-p-tolylamino naphthalene; 1-amino 4-beta-naphthylamino naphthalene; 1,4 dianilino naphthalene; 1,5 dianilino naphthalene; 1,8 dianilino naphtalene; 1,4 di (alpha-naphthylamino) naphthalene; 1,4 di (beta-naphthylamino) naphthalene; 1,4 di (p-tolylamino) naphthalene; 1,4 di (p-cumylamino) naphthalene; 1,4 di (p-biphenylamino) naphthalene; as well as other analogous compounds within the scope of the above definition. Any of the above-enumerated compounds may be used with good effect to retard the deterioration of rubber or other like organic substances, preferably in moderately small proportions, say from 0.1 to 5 per cent.

As a specific example of one embodiment of the invention of this application, a rubber composition is prepared containing blended plantation rubber 100 parts by weight, sulphur 5.5 parts, zinc oxide 30 parts, gas black 40 parts, mineral rubber 10 parts, palm oil 5 parts, and hexamethylene tetramine 0.75 part. One portion of this composition is used as a control, while another portion is further mixed with 0.96 part by weight (0.5% of the composition) of 1,4 dianilino naphthalene. After vulcanization in a press for 45 minutes at 294° F. to produce an optimum cure, it is found that the composition containing the anti-oxidant deteriorates only approximately half as fast as the control composition when subjected to an accelerated aging test such as the Geer oven test.

It is to be understood that the term "treating" is employed in the appended claims in a generic sense to include either the incorporation of the anti-oxidants into the rubber or the like by mixing them into the said material while it is in a plastic or fluid condition, or by applying them to the surface of a solid mass thereof as a paste, powder or solution. The term "rubber" is likewise employed in the claims in a generic sense to include caoutchouc, both natural and synthetic, balata, gutta-percha, rubber isomers, and like products, whether or not admixed with fillers, pigments, or vulcanizing or accelerating agents.

While I have herein disclosed certain preferred manners of performing my invention, I do not thereby desire or intend to limit myself solely thereto, for, as hitherto stated, the precise proportions of the materials utilized may be varied and other materials having equivalent chemical properties may be employed without departing from the spirit and scope of the invention as defined in the appended claims.

This application is a continuation in part of my co-pending application Serial No. 281,585 filed May 29, 1928, now Patent 1,940,815.

I claim:

1. The method of preserving rubber which comprises treating rubber with a symmetrical diphenyl substituted naphthylene diamine.

2. The method of preserving rubber which comprises treating rubber with a symmetrical diaryl substituted 1,4 naphthylene diamine.

3. The method of preserving rubber which comprises treating rubber with 1,4 dianilino naphthalene.

4. A composition comprising rubber and a symmetrical diaryl substituted naphthylene diamine.

5. A composition comprising rubber and a symmetrical diaryl substituted 1,4 naphthylene diamine.

6. A composition comprising rubber and 1,4 dianilino naphthalene.

7. The method of preserving rubber which comprises treating rubber with an N,N' diaryl substituted naphthylene diamine.

8. A composition comprising rubber and an N,N' diaryl substituted naphthylene diamine.

9. The method of preserving rubber which comprises treating rubber with a dianilino naphthalene.

10. The method of preserving rubber which comprises treating rubber with an N,N' diaryl substituted 1,4 naphthylene diamine.

11. A composition comprising rubber and a dianilino naphthalene.

12. A composition comprising rubber and an N,N' diaryl substituted 1,4 naphthylene diamine.

WALDO L. SEMON.